United States Patent
Smith

(10) Patent No.: US 6,182,986 B1
(45) Date of Patent: Feb. 6, 2001

(54) LAMINATED SKATEBOARD

(76) Inventor: Creighton B. Smith, 4105 Robin Rd. West, University Place, Tacoma, WA (US) 98466

( * ) Notice: Under 35 U.S.C. 154(b), the term of this patent shall be extended for 0 days.

(21) Appl. No.: 09/076,218

(22) Filed: May 8, 1998

(51) Int. Cl.$^7$ .................................................. B62M 1/00
(52) U.S. Cl. .................. 280/87.042; 280/610; 428/537.1
(58) Field of Search ............................. 280/87.042, 14.2, 280/610, 601, 87.041; 428/537.1

(56) References Cited

U.S. PATENT DOCUMENTS

| | | | | |
|---|---|---|---|---|
| 3,844,576 | * | 10/1974 | Schultes | 280/610 |
| 4,412,687 | * | 11/1983 | Andre | 280/610 |
| 4,523,772 | * | 6/1985 | Arnsteiner | 280/610 |
| 5,005,853 | * | 4/1991 | Lampl | 280/610 |
| 5,649,717 | * | 7/1997 | Augustine et al. | 280/610 |
| 5,759,664 | * | 6/1998 | Chisnell et al. | 428/109 |
| 5,803,478 | * | 9/1998 | Gavalis | 280/601 |
| 5,855,389 | * | 1/1999 | Andrus et al. | 280/602 |

* cited by examiner

*Primary Examiner*—J. J. Swann
*Assistant Examiner*—David R. Dunn
(74) *Attorney, Agent, or Firm*—Dean A. Craine

(57) ABSTRACT

An improved skateboard having laminations which are respectively selected from at least two or more materials, one material being wood and the other material being non-wood. Lamination of the two or more materials consisting of wood and non-wood plys positioned in proportionate lengths and order, combines to structurally enhance the completed lamination. The difference in physical properties between the wood and non-wood plys and the placement thereof yields a laminated skateboard with greater resilience, strength and elasticity than previous wood and/or non-wood constructions.

8 Claims, 7 Drawing Sheets

LAMINATED SKATEBOARD

BACKGROUND TO THE INVENTION

The current fundamental maneuver of skateboarding is the ollie. This maneuver is accomplished when the rider simultaneously jumps and kicks the tail of the board to the ground with his back foot, thus causing the board to "pop" off the ground. Once the rider has popped the board off the ground the maneuver is completed by leveling the board with the rider's front foot. This is the means by which the rider jumps with the board into the air.

SUMMARY OF INVENTION

An improved skateboard is provided for all uses of a skateboard and in particular for performing a fundamental maneuver referred to as an ollie. The improved skateboard has increased resiliency, strength and elasticity. The improvements involve the various arrangements of wood and non-wood laminates, or plies, all of which are thinner than $1/16$", and the minimum number of the total number of laminates is seven. It is therefore the primary objective of the present invention to provide a skateboard with increased resiliency, strength, and elasticity.

One of the objectives of this innovation consists of using individual plies thinner than $1/16$", which allows an increased number of plies to be used in the laminate, resulting in a minimization of structural imperfections in the laminate and a maximization of overall board strength.

Another of the objectives of this innovation is to increase the spring constant in the longitudinal direction with interply lamination of woven fiberglass for reinforcement, thus resulting in increased spring constant and overall strength in the longitudinal and latitudinal directions.

Yet another objective of this innovation is the direct application of Hooke's law wherein the placement of the non-wood materials, such as carbon fiber and/or fiberglass, constitutes a design feature that in the final laminate produces a continuous spring. This continuous spring has one center of flexure centered about the center of the board, or two centers of flexure centered about each truck (flexible axle). The method of construction relies on the separation of the spring's constituent parts: plies of wood and/or fiberglass.

DESCRIPTION OF THE PREFERRED EMBODIMENT(S)

Prior Art-Skateboards

Current manufacturing techniques rely solely on the rigidity or stiffness of the skateboard to achieve the popping action required to perform the ollie. The construction typically consists of seven layers of maple cut to $1/16$" with two of the plies being cross plies. The result is a laminate $7/16$" thick.

Another method of skateboard construction is to use a wood or non-wood core with a fiberglass envelope; resulting in a board more rigid than the current seven layers, $1/16$" ply construction.

These methods of construction do not optimize the potential strength of the board. Further, previous construction techniques do insure losses in energy due to internal interference. These losses in energy represent a damping coefficient, which detracts from the "pop" of the skateboard.

By maximizing the laminate's structural potential, increasing internal resiliency and decreasing the damping coefficient, the afore-mentioned problems in previous art are solved.

Description of Innovation

The skateboards illustrated in FIGS. 1, 2, 3, and 4 depict the two current industry standards of construction.

Figure 1:
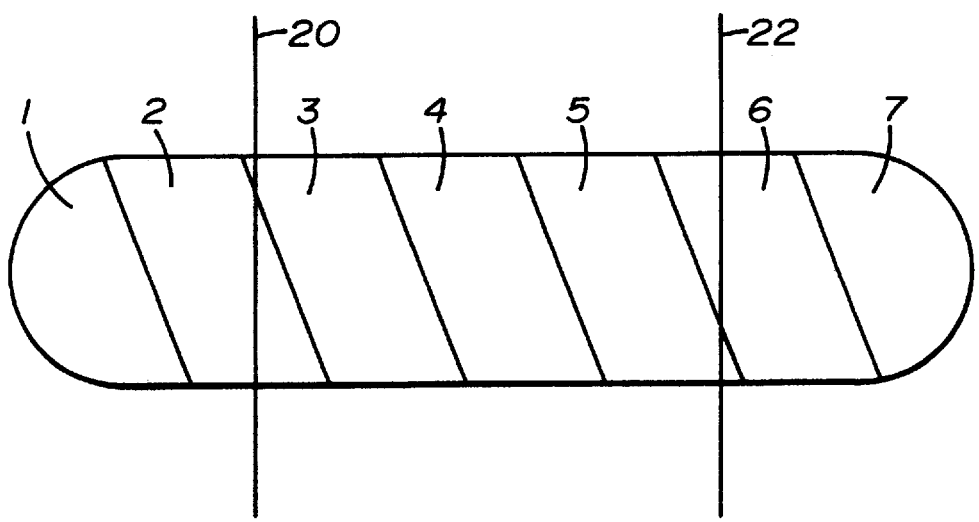
FIG. 1 is a top view, with portions removed, to illustrate the prior art in reference to a currently manufactured all-wood skateboard having seven layers, plies or laminates that are all $1/16$" thick.
Figure 2:
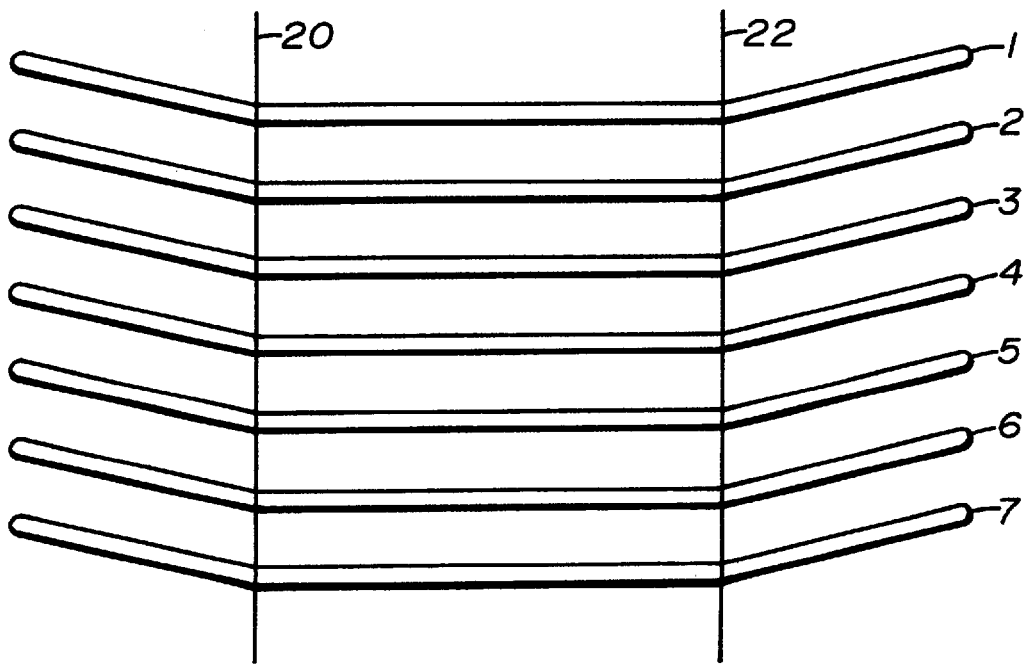
FIG. 2 represents the side elevation of the board shown in FIG. 1.
Figure 3:
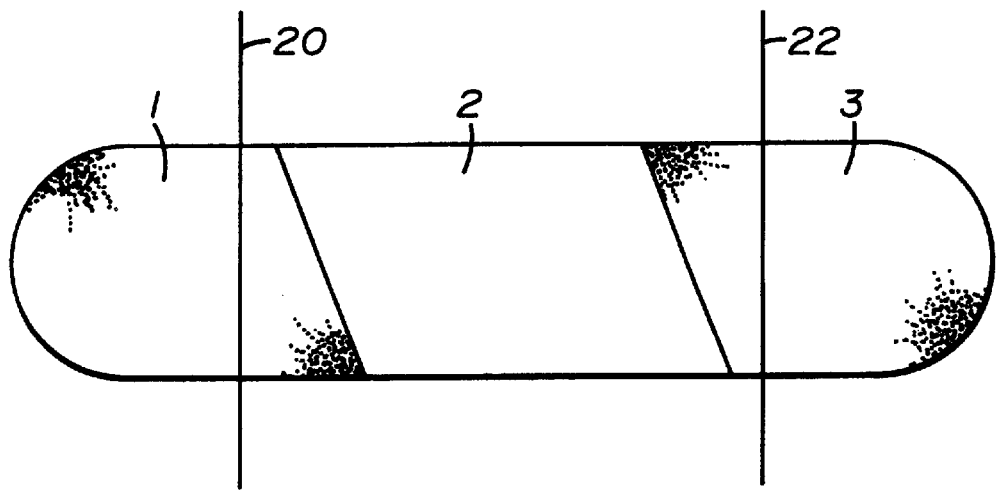
FIG. 3 is a top view, with portions removed, to illustrate the prior art in reference to a currently manufactured skateboard having either a wood or non-wood core with fiberglass reinforcement on the top and bottom of the board.
Figure 4:
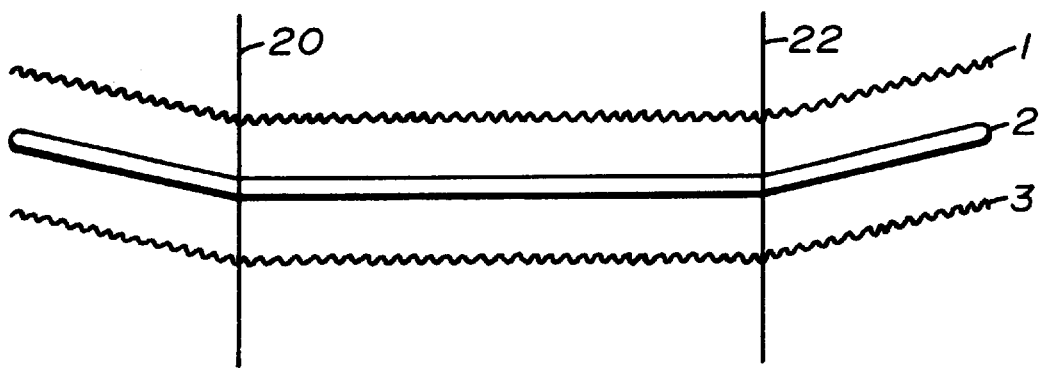
FIG. 4 represents the side view of the skateboard described in FIG. 3.
Figure 5:
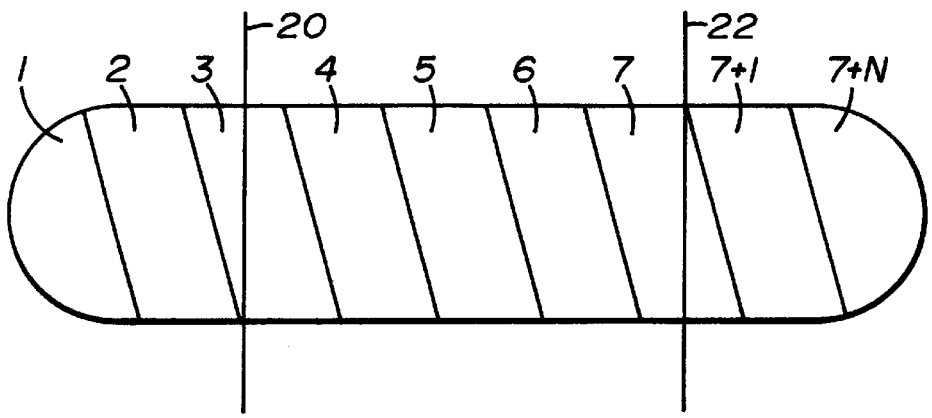
FIG. 5 represents the top view, with portions removed, to illustrate an embodiment of the improved skateboard with more than seven layers of wood plies less than $1/16$" in thickness.
Figure 6:
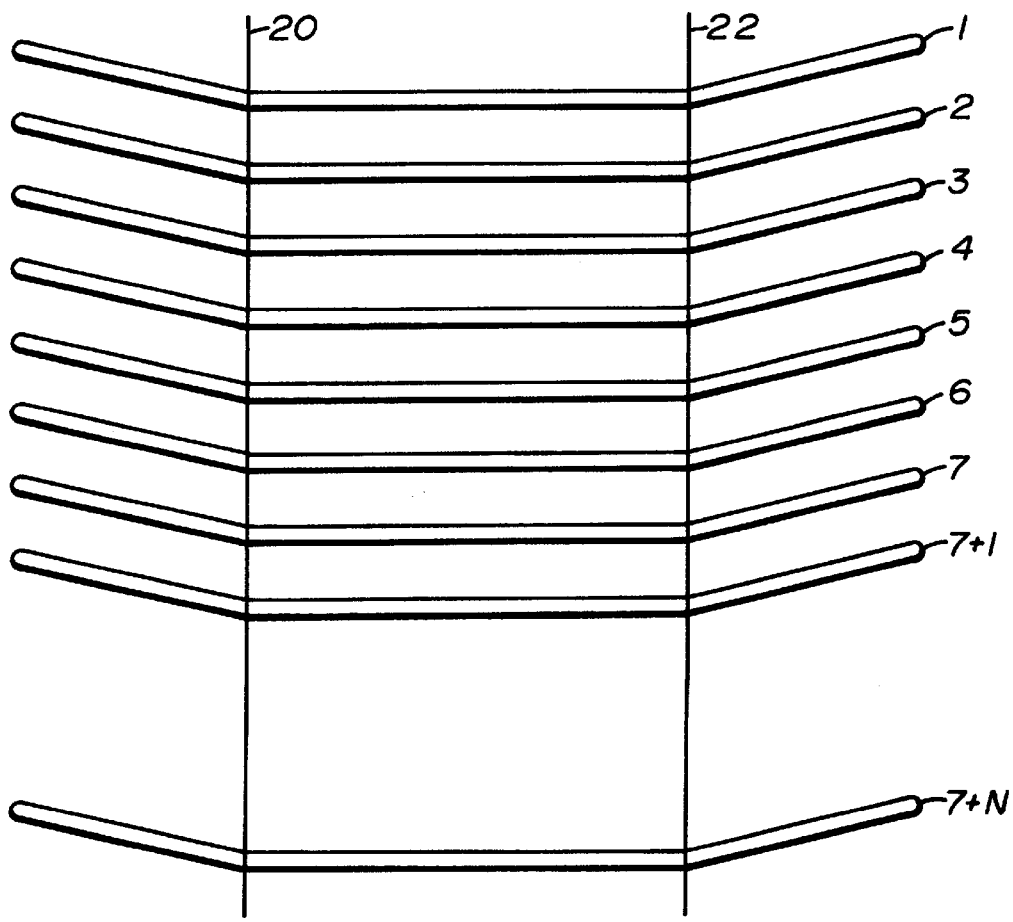
FIG. 6 represents the side elevation of FIG. 5.

FIG. 5 represents the top cutaway view of the embodiment of this innovation that uses more than seven layers of veneer, of which a percentage can be cross plies,; each ply being thinner than $1/16$", thus minimizing the wood's inherent structural imperfections. This can also be seen in the side view, FIG. 6.

Figure 7:
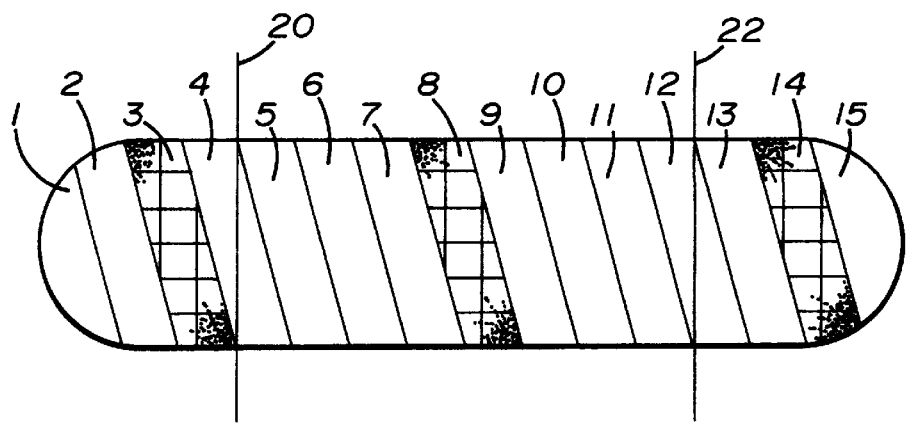
FIG. 7 represents a top view, with portions removed, to illustrate an embodiment of the improved skateboard with more than seven layers of wood having a carbon fiber spring built into the laminate at strategic points.
Figure 8:
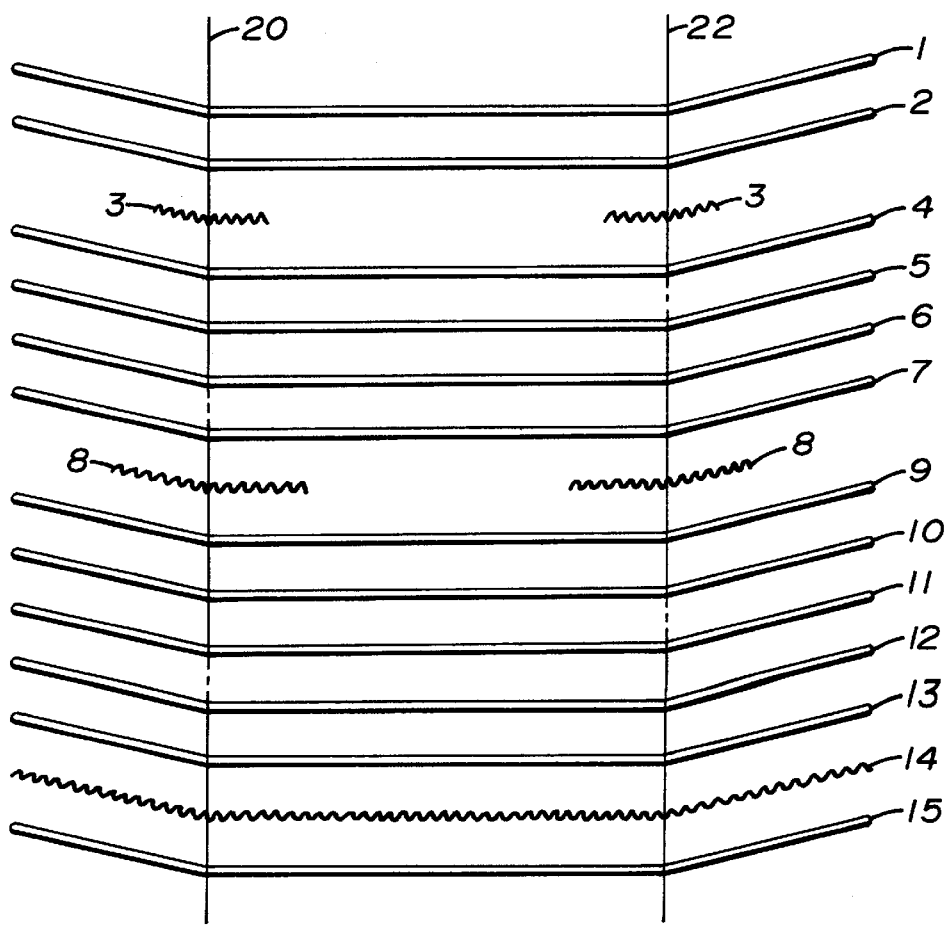
FIG. 8 represents the side elevation of FIG. 7.

FIG. 7 represents the embodiment of this innovation that uses the non-wood materials, such as carbon fiber, placed in the aforementioned prescribed harmonic sequence for the purpose of decreasing the damping effects of internal interference that result in energy loss. This is shown in layers 3, 8 and 14 of FIG. 8, their placement is only limited to the internal layers to protect the spring from being damaged. FIG. 8 shows the side view details of the aforementioned location of the spring's constituent parts.

Figure 9:
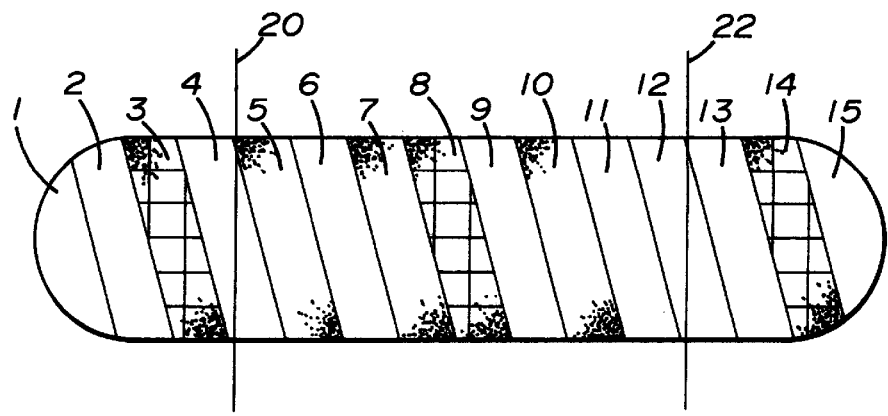
FIG. 9 represents a top view, with portions removed, to illustrate an embodiment of the improved skateboard with more than seven layers of wood having fiberglass reinforcement and an internal carbon fiber spring.
Figure 10:
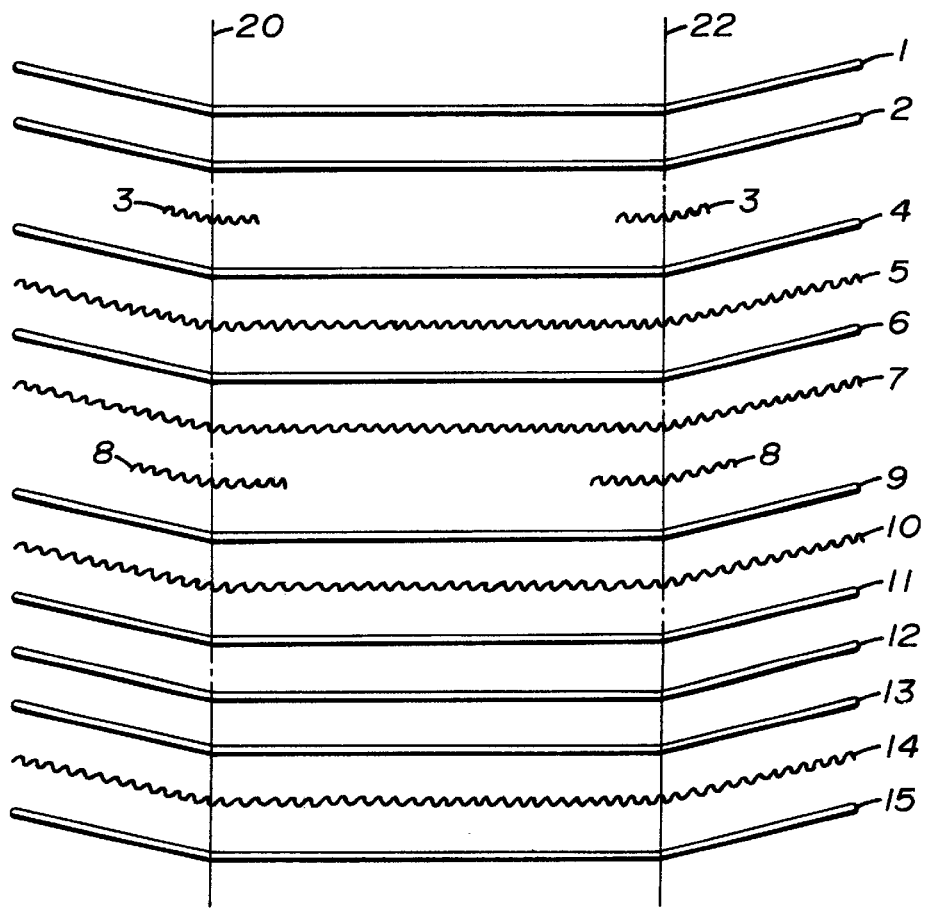
FIG. 10 represents a side elevation of FIG. 9.

Another embodiment of this innovation is shown in FIG. 9. In this figure, woven fiberglass is used to structurally enhance the board in the lateral and longitudinal directions. The fiberglass is shown in layers 4, 6, and 8 of FIG. 10. The only requirement for the placement of the fiberglass is that it must reside within the top and bottom layers of the laminate. The carbon fiber's location, placement and number of constituent parts is limited only by inter-ply lamination, therefore the spring must reside within the confines of the top and bottom layers of the laminate. This also protects the integrity of the spring.

Figure 11:
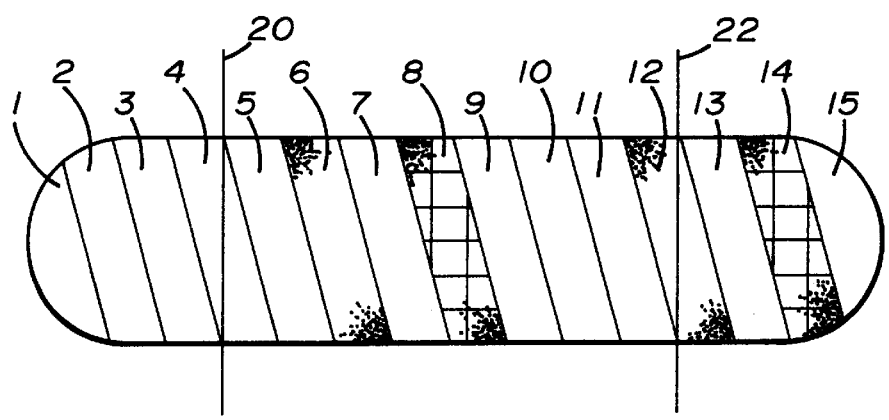
FIG. 11 represents a top view, with portions removed, to illustrate an embodiment of the improved skateboard with more than seven layers of wood having fiberglass and carbon fiber, combining to produce an internal spring.
Figure 12:
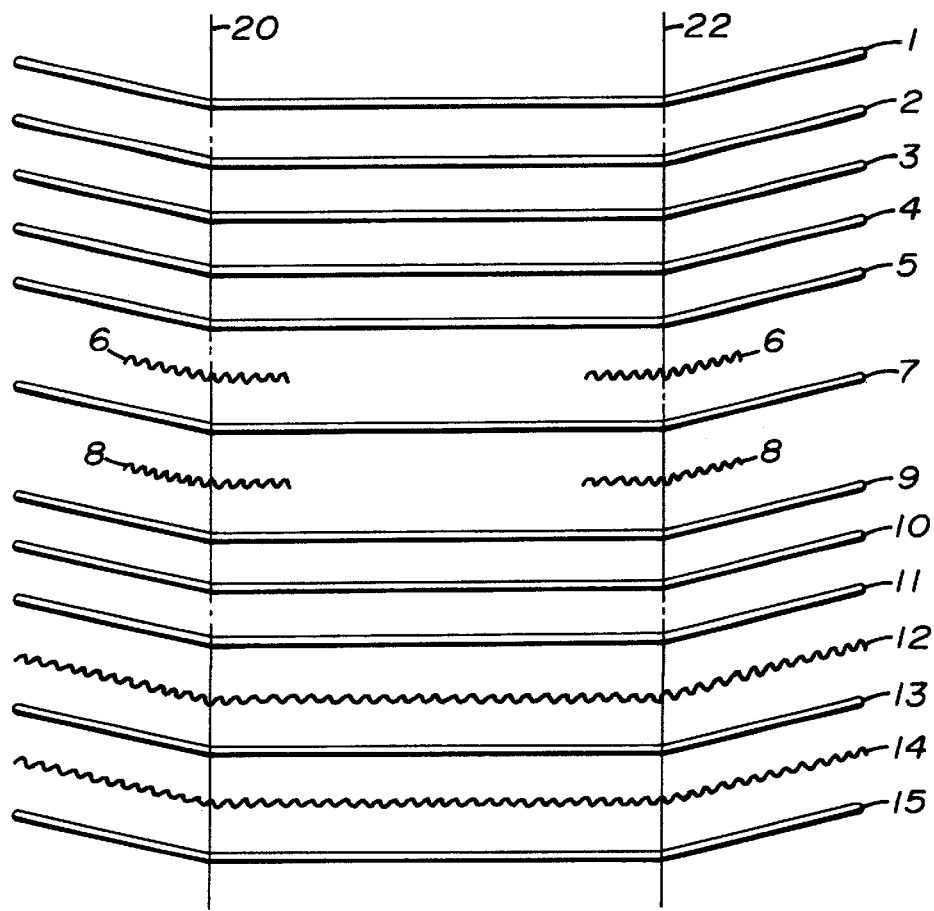
FIG. 12 represents the side elevation of FIG. 11.

The next embodiment of this innovation is illustrated in FIG. 11. This figure represents a board with spring layers consisting of carbon fiber or fiberglass. In FIG. 12, the location of the spring element is shown in layers 6, 8, 12 and 14, however the number of the spring's element parts and their position is not limited to these locations. The only limit is that the spring layers must reside inside the top and bottom layers 1, 15 of the board to protect the spring's constituent parts.

Figure 13:
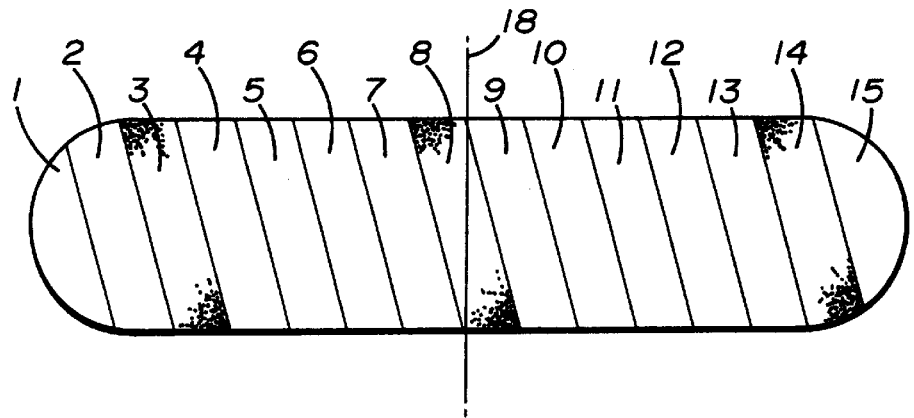
FIG. 13 represents a top view, with portions removed, to illustrate an embodiment of the improved skateboard with more than seven layers containing an internal spring.
Figure 14:
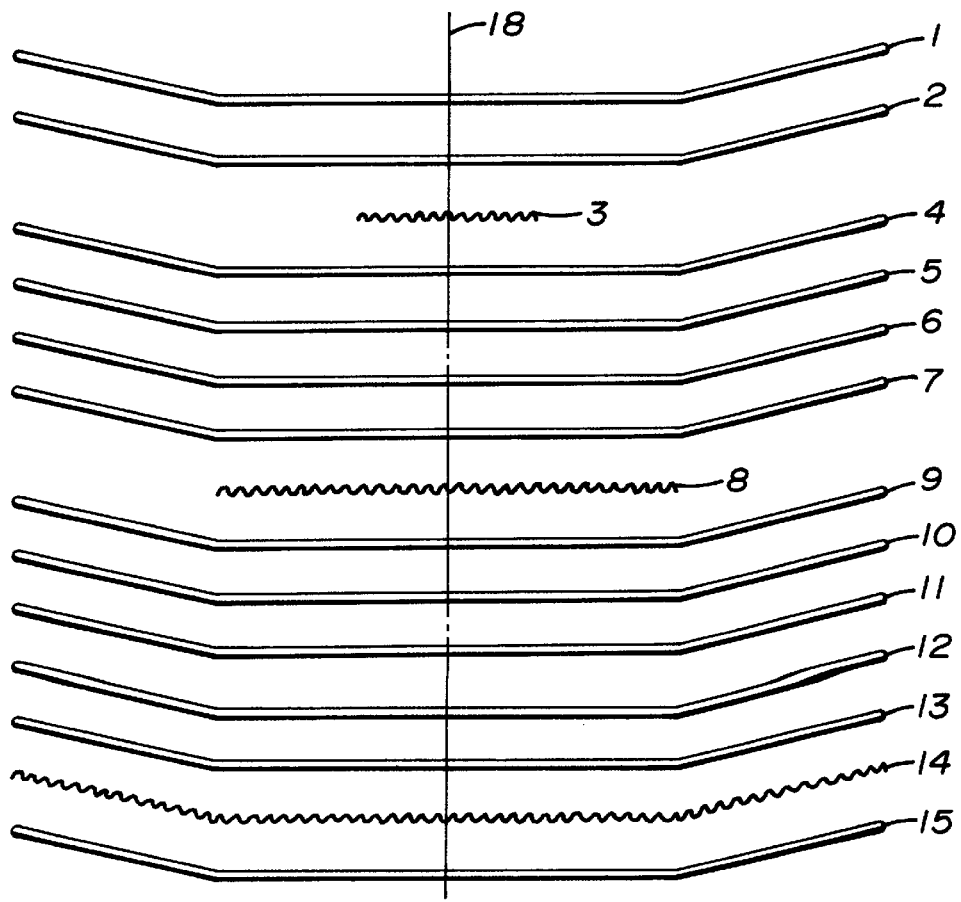
FIG. 14 represents the side elevation of FIG. 13.

The next embodiment of this innovation is illustrated in FIG. 13. This figure represents a board with a carbon fiber or fiberglass spring, with one center of flexure centered about the center axis 18 of the board. In the figure, the non-wood material is located in layers 3, 8, and 13. These locations are non-specific; the only requirement for the location of the spring is that it must reside within the confines of the laminate. This is also illustrated in FIG. 14, which represents the side elevation of the board in FIG. 13.

Mathamatized and Physical Concepts Helpful in Describing the Improved Laminated Skateboard Let: k=The Spring Constant
Let: $y_0$=The displacement of the spring at static equilibrium
Let: c=The Damping Coefficient
Let: F1=(Mass of Rider)×(Acceleration Due to Gravity)
Let: F2=(−k)×(y), Hooke's Law
Let: F3=(−c)×(v) Or F3=(−c)×(y') where $$\frac{dy}{dt} = v$$

Let: y=The vertical displacement from static equilibrium
At Rest: $F_1+F_2=0=m\cdot g-k\cdot y_0$
By Newton's Second Law: $m\cdot a=(-k)\cdot y$
In Differential Form:

$$m\cdot\left(\frac{d^2}{dt^2}\cdot y\right) + k\cdot y = 0$$

The general solution then is: $y(t)=A\cdot\cos(\omega_0\cdot t)+B\cdot\sin(\omega_0\cdot t)$
Where:

$$\omega_0 = \sqrt{\frac{k}{m}} \quad \text{and} \quad C^2 = A^2 + B^2 \quad \text{Implies} \quad C = \sqrt{A^2+B^2} \quad \text{and} \quad \tan(\delta) = \frac{B}{A}$$

Now the general solution can be written: $y(t)=C\cdot\cos(\omega_0\cdot t-\delta)$ This system represents an undamped harmonic oscillator. Note, this system passes through equilibrium at integers of pi/2 and C remains constant. Therefore, in this "ideal" system no decay exists and no energy losses occur.

The general damped harmonic solution is at rest: $F_1+F_2=0=m\cdot g-c\cdot v$
By Newton's Second Law: $m\cdot a=(-k\cdot y)-c\cdot v$
The resulting forces are: $F_1+F_2+F_3=(-k\cdot y)-c\cdot v$ Written in differential form:

$$m\cdot\frac{d^2}{dt^2}\cdot y + c\cdot\frac{d}{dy}y + k\cdot y = 0$$

The corresponding characteristic equation is:

$$\lambda^2 + \frac{c}{m}\cdot\lambda + \frac{k}{m} = 0$$

The roots of the characteristic equation are:

$$\lambda_1 = \left(-\frac{c}{2\cdot m}\right) + \frac{\sqrt{c^2-4\cdot k\cdot m}}{2\cdot m} \quad \lambda_2 = \left(-\frac{c}{2\cdot m}\right) - \frac{\sqrt{c^2-4\cdot k\cdot m}}{2\cdot m}$$

$$\text{Let:} \quad \alpha = \frac{c}{2\cdot m} \quad \text{and} \quad \beta = \frac{1}{2\cdot m}\cdot\sqrt{c^2-4\cdot m\cdot k}$$

Then: $\lambda_1=(-\alpha+\beta)$ and $\lambda_2=(-\alpha-\beta)$
Three potential cases now exist:
Case 1. $c^2>4\cdot m\cdot k$ This corresponds to an "overdamped" harmonic system in which $\lambda_1$ and $\lambda_2$ are both distinct, real roots.
The general solution to this system is: $y(t)=c^1\cdot e^{-(\alpha-\beta)\cdot t}+c_2\cdot e^{-(\alpha+\beta)\cdot t}$
It is obvious that this system will never equal zero and therefore not oscillate.
Case 2. $c^2=4\cdot m\cdot k$ This corresponds to a "critically" damped harmonic system where: $\lambda_1=\lambda_2=(-\alpha)$ and $\beta=0$ The general solution is $y(t)=(c_1+c_2\cdot t)\cdot e^{(-\alpha\cdot t)}$
Since the exponential function is never zero and $c_1+C_2\cdot t$ can have at most one positive zero, this system can have at most one passage through the equilibrium position y=0
Case 3. $c^2>4\cdot m\cdot k$ This corresponds to the "underdamped" harmonic oscillator.
In this case $\beta=i\cdot\omega$ and $$\omega = \frac{1}{2\cdot m}\cdot\sqrt{4\cdot m\cdot k-c^2} = \sqrt{\frac{k}{m} - \frac{c^2}{4\cdot m^2}} > 0$$

Therefore: $\lambda_1=(-\alpha)+i\cdot\omega$ and $\lambda_2=(-\alpha)-i\cdot\omega$
The general solution is: $y(t)=C\cdot e^{(-\alpha)\cdot t}\cdot(A\cdot\cos(\omega\cdot t)+B\cdot\sin(\omega\cdot t))$
Or as above: $y(t)=C\cdot e^{(-\alpha)\cdot t}\cdot\cos(\omega\cdot t-\delta)$
This solution represents damped oscillations. Since cos $(\omega\cdot t-\delta)$ varies between −1 and 1, the curve of the solution lies between $y(t)=C\cdot e^{(-\alpha)\cdot t}\cdot\cos(\omega\cdot t-\delta)$ and $y(t)=-C\cdot e^{(-\alpha)\cdot t}\cdot\cos(\omega\cdot t-\delta)$ touching curves when $\omega\cdot t-\delta$ is an integer of $\pi$
From: $\beta=i\cdot\omega$ and $$\omega = \frac{1}{2\cdot m}\cdot\sqrt{4\cdot m\cdot k-c^2} = \sqrt{\frac{k}{m} - \frac{c^2}{4\cdot m^2}} > 0$$

It is obvious that, as the damping coefficient (c) tends to zero, w approaches $$\omega_0 = \sqrt{\frac{k}{m}}$$

corresponding to an undamped harmonic oscillator.
Therefore, if measures are taken to decrease the damping coefficient inherent to all "real life" systems, the board will lose less energy when the tail of the board is kicked to the ground, resulting in better board response and the ability for the rider to "ollie" the board higher than is possible using current skateboard design technology.

From the following, it will be shown that if the damping coefficient (c) is lowered and the spring constant (k) is increased, then fewer energy losses will occur.

The total energy of a damped harmonic oscillator is the sum of the potential and kinetic energies.

$$E = \frac{m}{2} \cdot \left(\frac{d}{dt}y\right)^2 + \frac{k \cdot y}{2}$$

Note, this is constant for an undamped system. Then the average rate of energy dissipation is:

$$\frac{d}{dt}E = \left(m \cdot \frac{d}{dt}y\right) \cdot \left(\frac{d^2}{dt^2} \cdot y\right) + \left(k \cdot \frac{d}{dt}y\right) \cdot \left(\frac{d^2}{dt^2} \cdot y\right)$$
$$= \left(m \cdot \frac{d^2}{dt^2} \cdot y + k \cdot y\right) \cdot \frac{d}{dt}y$$

So the differential equation of motion is:

$$m \cdot \frac{d^2}{dt^2} \cdot y + c \cdot \frac{d}{dt}y + k \cdot y = 0$$

Therefore:

$$\frac{d}{dt}E = (-c) \cdot \left(\frac{d}{dt}y\right)^2$$

From the Fifth Edition of Analytical Mechanics, by: Fowles and Cassiday, copyright 1986 by Holt, Rinehart and Winston Inc., pg. 92 "If we identify the damping factor c/m with a time constant τ, such that $c/m = \frac{1}{\tau}$, then we have $\Delta E = \left[\frac{1}{2} \cdot m \cdot A^2 \cdot (\omega_0)^2 \cdot e^{-\frac{t}{\tau}}\right] \cdot \frac{T_d}{\tau}$ Where $T_d$ is the period of oscillation, and ΔE is the energy lost in a single cycle.

From example 3.3a of the same edition, the energy stored in the oscillator at any time t is:

$$E(t) = \frac{1}{2} \cdot m \cdot (\omega_0)^2 \cdot A^2 \cdot e^{-\frac{t}{\tau}}$$

It is now apparent that by: 1) increasing the spring constant (k) increases thus the total energy output of the system is increased. 2) by decreasing the damping coefiecient and therefore increasing τ the total energy output of the system is increased.

1) Is accomplished by "inter-ply" lamination of non-wood materials, such as carbon fiber and/or fiberglass to stiffen the board thus increasing the spring constant (k)

2) Is accomplished by building a semi-eliptical leaf spring into the laminate. The spring's construction may consist of two formats.

2a. One leaf spring with one center of flexure.

2b. One leaf spring with two centers of flexure.

The method of construction for a spring with one center of flexure consists of placing the non-wood elements in a harmonic sequence over the center axis 18 of the skateboard such that the length of spring member $n=(1/n) \cdot L$, where L is the overall length of the board. For construction of a spring with two centers of flexure the length of member $n_1=L$ and $n_{2 \ldots m}=(\frac{1}{2} \cdot 1/n) \cdot L$ centered over the axis 20, 22 of each truck (flexible axle).

For example if: L=32 and 6 elements n=1, 2 . . . 6

The sequence for a spring with one center of flexure is:

$$\frac{1}{n} \cdot L$$

| 32 |
|---|
| 16 |
| 10.667 |
| 8 |
| 6.4 |
| 5.333 |

The sequence of each of the two elements comprising one spring with two centers of flexure is:

$$\frac{1}{2 \cdot n} \cdot L$$

| 16 |
|---|
| 8 |
| 5.333 |
| 4 |
| 3.2 |
| 2.667 |

Note: the first term of this sequence represents ½ of the continuous spring member. Subsequent members are centered half the distance from the center to the nose or tail.

What is claimed is:

1. A skateboard comprising a plurality of stacked wood and non-wood laminate layers, said skateboard having a center axis with said non-wood laminate layers being centered over said center axis and being stacked according to their lengths from longest to shortest, the length of each said non-wood laminate layer being determined by the formula: 1/n×L wherein "n" is the number of the specific non-wood laminate layer in the stack of non-wood laminate layers beginning with the lowest non-wood laminate layer, and "L" is the overall length of said skateboard.

2. A skateboard, as recited in claim 1, wherein each said wood and non-wood layer is less than ¹⁄₁₆" thick.

3. A skateboard, as recited in claim 1, wherein each said non-wood layer is made of fiberglass.

4. A skateboard, as recited in claim 1, wherein each said non-wood layer is made of carbon fiber material.

5. A skateboard comprising a plurality of stacked wood and non-wood laminate layers, said skateboard having a center axis with said non-wood laminate layers being centered over a truck axis and being stacked according to their lengths from longest to shortest, the length of each said non-wood laminate layer being determined by the formula: ½(n)×L wherein "n" is the number of the specific non-wood laminate layer in the stack of non-wood laminate layers beginning with the lowest non-wood laminate layer, and "L" is the overall length of said skateboard.

6. A skateboard, as recited in claim 5, wherein each said wood and non-wood layer is less than ¹⁄₁₆" thick.

7. A skateboard, as recited in claim 6, wherein each said non-wood layer is made of fiberglass.

8. A skateboard, as recited in claim 6, wherein each said non-wood layer is made of carbon fiber material.

* * * * *